United States Patent
Vujcic

(10) Patent No.: US 8,693,448 B2
(45) Date of Patent: Apr. 8, 2014

(54) RANDOM ACCESS PROCEDURE

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 13/148,933

(22) PCT Filed: Nov. 12, 2009

(86) PCT No.: PCT/KR2009/006649
§ 371 (c)(1),
(2), (4) Date: Aug. 10, 2011

(87) PCT Pub. No.: WO2010/093111
PCT Pub. Date: Aug. 19, 2010

(65) Prior Publication Data
US 2011/0310857 A1  Dec. 22, 2011

Related U.S. Application Data

(60) Provisional application No. 61/151,808, filed on Feb. 11, 2009.

(51) Int. Cl.
*H04J 3/00* (2006.01)
*H04W 4/00* (2009.01)

(52) U.S. Cl.
USPC .......................................... 370/337; 370/338

(58) Field of Classification Search
USPC ............... 370/310.2, 310–350, 503
See application file for complete search history.

(56) References Cited

U.S. PATENT DOCUMENTS

| 6,785,548 | B2 * | 8/2004 | Moulsley et al. | 455/450 |
|---|---|---|---|---|
| 7,839,829 | B2 * | 11/2010 | Lee et al. | 370/336 |
| 7,916,689 | B2 * | 3/2011 | Jeong et al. | 370/328 |
| 8,395,985 | B2 * | 3/2013 | Dinan | 370/206 |
| 2007/0206531 | A1 * | 9/2007 | Pajukoski et al. | 370/329 |
| 2008/0139214 | A1 * | 6/2008 | Sun et al. | 455/450 |
| 2008/0194243 | A1 | 8/2008 | Jeong et al. | |
| 2008/0267127 | A1 * | 10/2008 | Narasimha et al. | 370/331 |
| 2008/0310395 | A1 * | 12/2008 | Kashima | 370/350 |
| 2009/0318175 | A1 * | 12/2009 | Sandberg | 455/502 |
| 2010/0074204 | A1 * | 3/2010 | Meylan | 370/329 |
| 2010/0093386 | A1 * | 4/2010 | Damnjanovic et al. | 455/522 |
| 2010/0238872 | A1 * | 9/2010 | Kim et al. | 370/329 |
| 2011/0096748 | A1 * | 4/2011 | Meyer et al. | 370/329 |
| 2011/0216705 | A1 * | 9/2011 | Lee et al. | 370/328 |

FOREIGN PATENT DOCUMENTS

| KR | 20070121505 | 12/2007 |
|---|---|---|
| WO | 2007/024791 | 3/2007 |
| WO | 2007/052900 | 5/2007 |

* cited by examiner

*Primary Examiner* — Warner Wong
(74) *Attorney, Agent, or Firm* — Lee, Hong, Degerman, Kang & Waimey

(57) ABSTRACT

The invention relates to a method of random access, comprising: a higher layer instructs the lower layer to transmit a random access preamble, wherein the timing transmission of the random access preamble is adjusted by the lower layer according the triggered resources.

7 Claims, 8 Drawing Sheets

RANDOM ACCESS PROCEDURE

CROSS-REFERENCE TO RELATED APPLICATIONS

This application is the National Stage filing under 35 U.S.C. 371 of International Application No. PCT/KR2009/006649, filed on Nov. 12, 2009, which claims the benefit of U.S. Provisional Application Ser. No. 61/151,808, filed on Feb. 11, 2009, the contents of which are incorporated by reference herein in their entirety.

FIELD OF THE INVENTION

The present invention relates to a random access channel (RACH) procedure in a cellular communications network, and in particular to a method and apparatus for configuring the timing of transmission of a preamble. While it is described below in the context of a long term evolution (LTE) or advanced long term evolution (LTE-A) type cellular network for illustrative purposes and since it happens to be well suited to that context, those skilled in the art will recognise that the invention disclosed herein can also be applied to various other types of cellular networks.

DISCUSSION OF THE RELATED ART

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal terrestrial radio access system (E-UTRA). The E-UTRA may be also referred to as an LTE system. The communication network is widely deployed to provide a variety of communication services such as voice and packet data.

As illustrated in FIG. 1, the E-UTRA network includes an evolved UMTS terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.

a UE is not time-synchronized with a eNodeB and starts transmitting data (for instance the user calls).

a eNodeB starts transmitting data to the UE but they are not synchronized (for instance the user receives a call).

a eNodeB measures a delay of the received signal from the UE (for instance the user is moving and has lost synchronization).

a UE is moving from one cell to another and needs to be time-synchronized with a different target eNodeB than the serving eNodeB it is registered to (handover).

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band. The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

The Zadoff-Chu Zero Correlation Zone (ZC-ZCZ) sequences are used to fulfil these requirements. Each cell possesses a set of 64 signatures obtained from ZC-ZCZ sequences. The length of one sequence is N=839 samples. A ZC-ZCZ sequence is defined by two integers: u is the root index and v is the cyclic shift index.

In the time domain, the v-th cyclic shift is extracted from the u th root with:

$$x_{u,v}(n) = x_u(n + v \cdot N_{CS}) n = 0 \ldots N-1$$

where $N_{CS}$ is the cyclic shift length.

The u-th root sequence in the frequency domain is given by:

$$x_u(n) = e^{i\pi \cdot u \cdot \frac{n(n+1)}{N}}$$

The ZC-ZCZ sequences are used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

The random access procedure in terms of the physical layer L1, the MAC layer L2 and the RRC layer L3 is illustrated in FIG. 6. In step S1 the L2/L3 layers indicate to the UE to transmit a random access preamble. In step S2 the L1 layer transmits a random access preamble in the first sub-frame where PRACH resource becomes available. In step S3 the detection of a random access response PDCCH with the indicated RA-RNTI is attempted during a window controlled by L2/L3. The corresponding PDSCH transport block is passed to L2/L3 in step S4 which takes charge of parsing the received transport block.

If in step S5 the transport block contains a response to the transmitted preamble sequence then the UL-SCH transport block is transmitted according to the timing according to case A as described in more detail below.

If no random access response is received or if a random access response is received but the corresponding transport block does not contain a response to the transmitted preamble sequence then the L2/L3 requests the L1 to transmit a new preamble sequence.

A problem is that different time offsets for different causes of preamble transmission are specified for LTE. The ambiguity results from the fact that the random access preamble retransmission is handled by layer L2. Therefore layer L1 is not able to determine the allowed transmission time offset for random access preamble transmission.

SUMMARY OF THE INVENTION

In a general form the invention relates to a method of random access, comprising: a higher layer instructs the lower layer to transmit a random access preamble, wherein the timing transmission of the random access preamble is adjusted by the lower layer according the triggered resources.

According to a first aspect of the present invention there is provided a method of random access, comprising: a higher layer transmitting an indicator to a lower layer, indicating to the lower layer to transmit a random access preamble, wherein the indicator includes a cause value indicating the cause of the transmission of the random access preamble; and the lower layer adjusting timing of the preamble transmission according to the cause value.

Thus, the L1 can determine the allowed transmission time offset for RACH preamble transmission and can adjust the timing of the transmission of the preamble accordingly.

According to a second aspect of the present invention there is provided a user equipment operable on at least a higher layer and a lower layer and comprising: a transceiver for transmitting a random access preamble and for receiving a random access response and having a higher layer operable to transmit an indicator to a lower layer, indicating to the lower layer to transmit a random access preamble, wherein the indicator includes a cause value indicating the cause of the transmission of the random access preamble; and the lower layer is operable to adjust timing of the preamble transmission according to the cause value.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:

FIG. 1 is a block diagram illustrating network structure of an E-UTRA system.

FIGS. 2(*a*), 2(*b*) and 2(*c*) are block diagrams depicting logic architecture of typical network entities of the LTE system (FIG. 2(*a*)), a user-plane (U-plane) protocol stack (FIG. 2(*b*)) and a control-plane (C-plane) protocol stack (FIG. 2(*c*)).

FIG. 3 graphically illustrates an example of the location of RACH slots in a 2.5 MHz bandwidth FIG. 4 is a diagram illustrating a typical RACH procedure FIG. 5 schematically illustrates a RACH preamble structure in E-UTRA FIG. 6 is a flow chart illustrating a method of random access response to the prior art.

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and an eNodeB.

Figure 1:
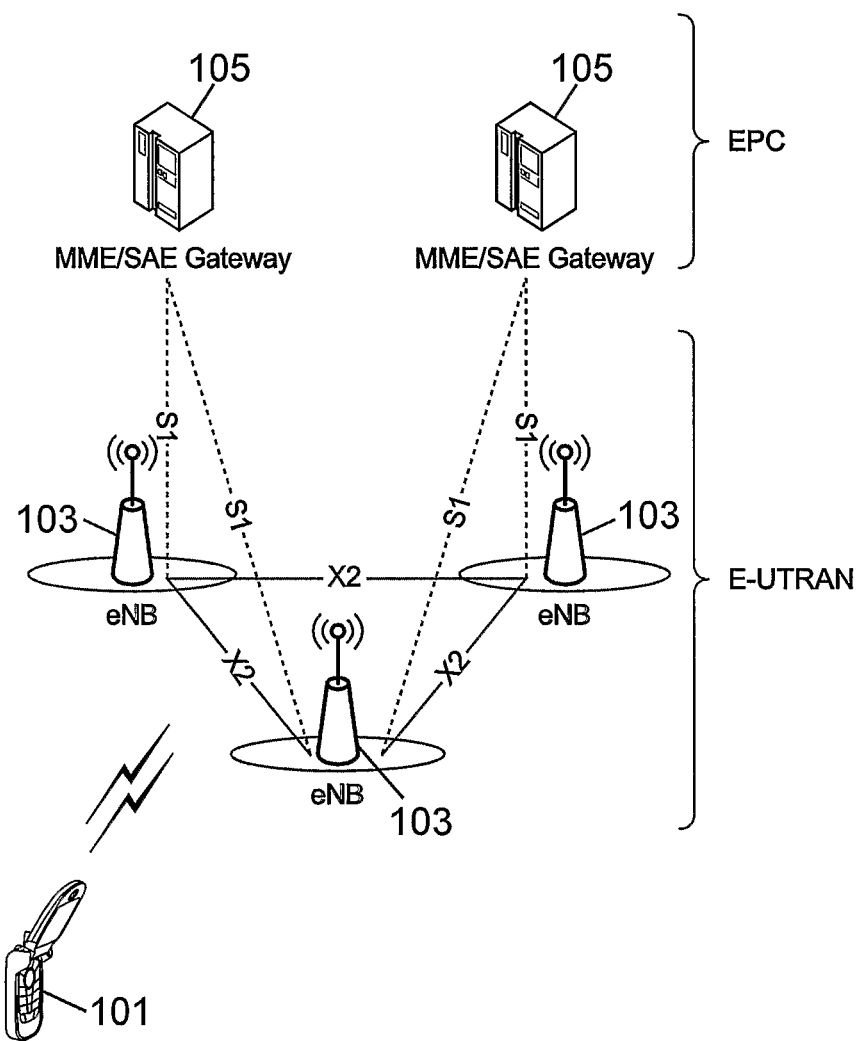
Figure 2A:
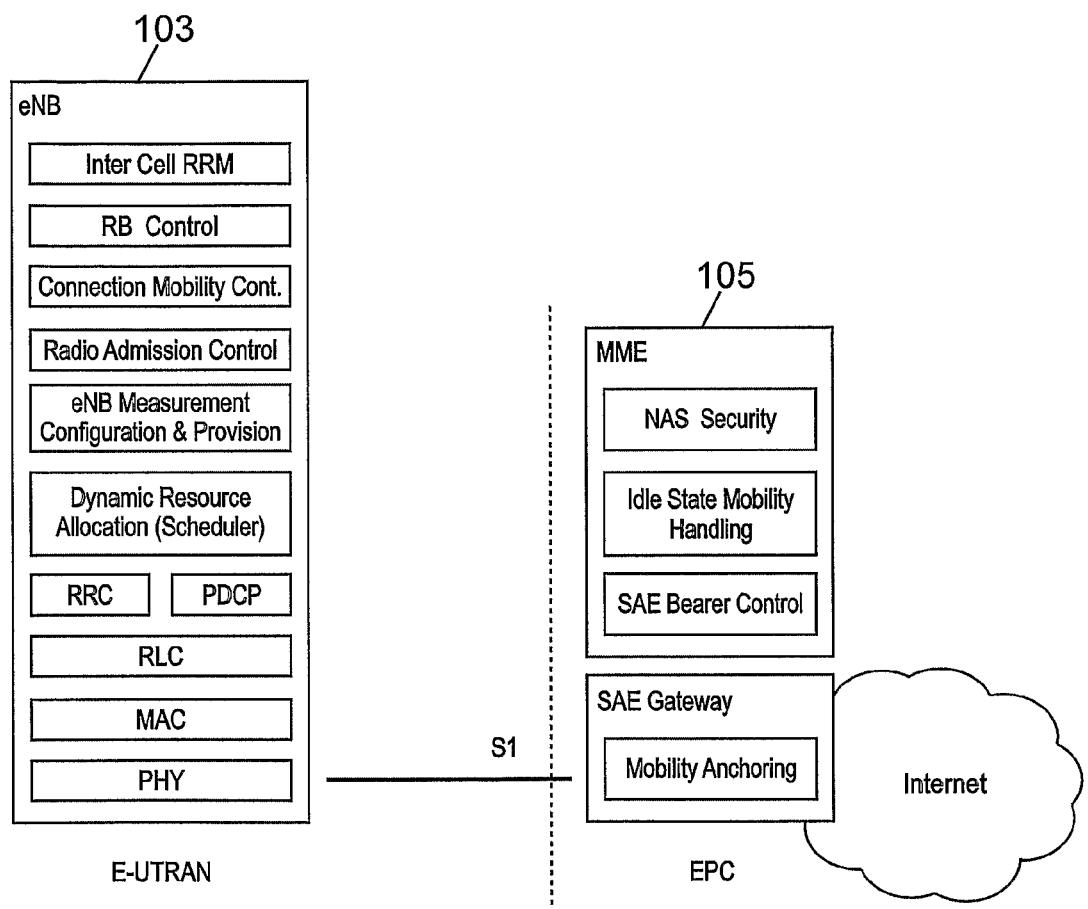
Figure 2B:
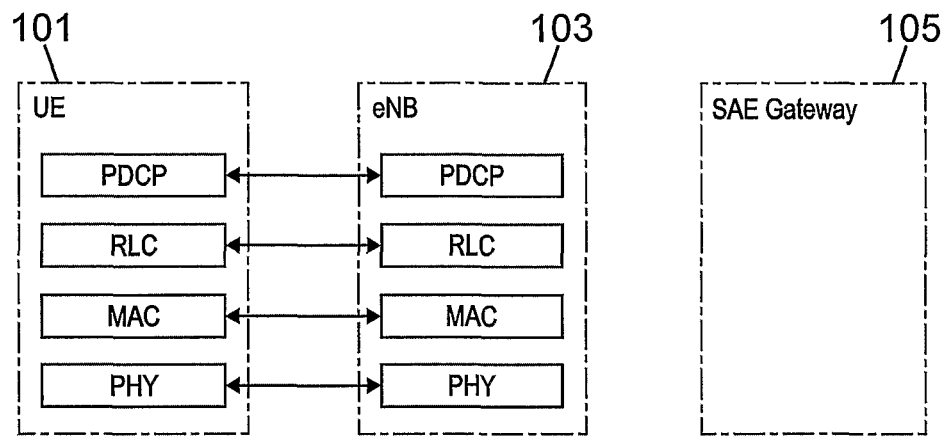
Figure 2C:
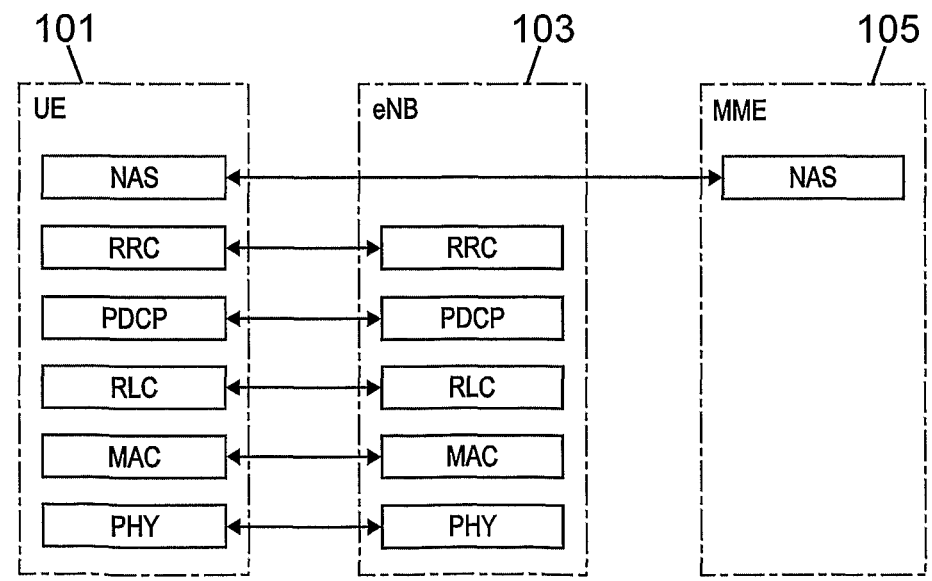
Figure 3:
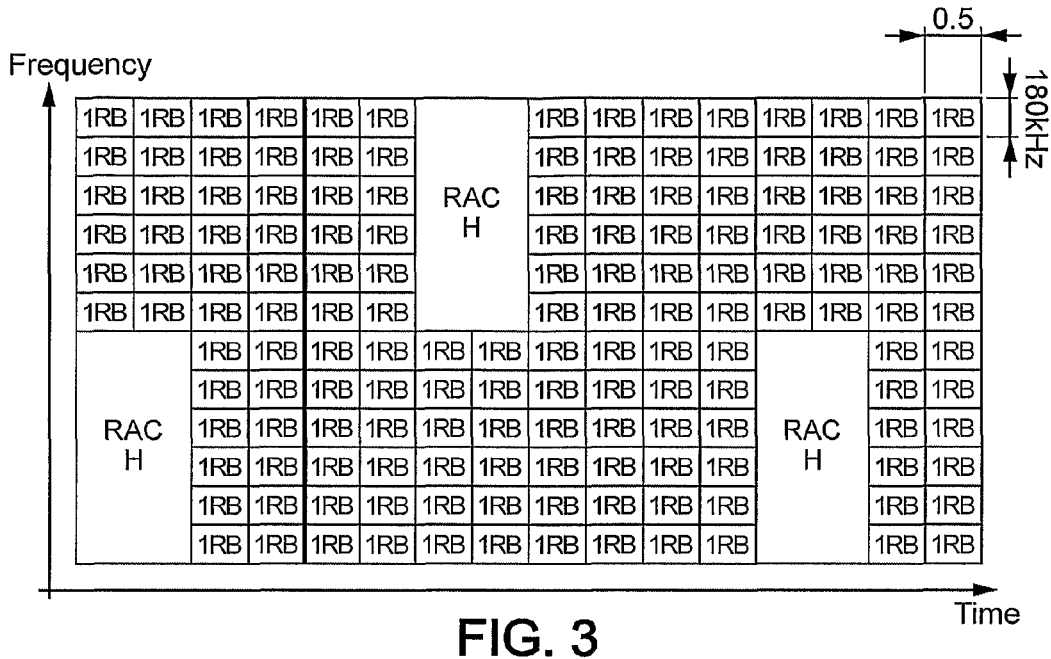
Figure 4:
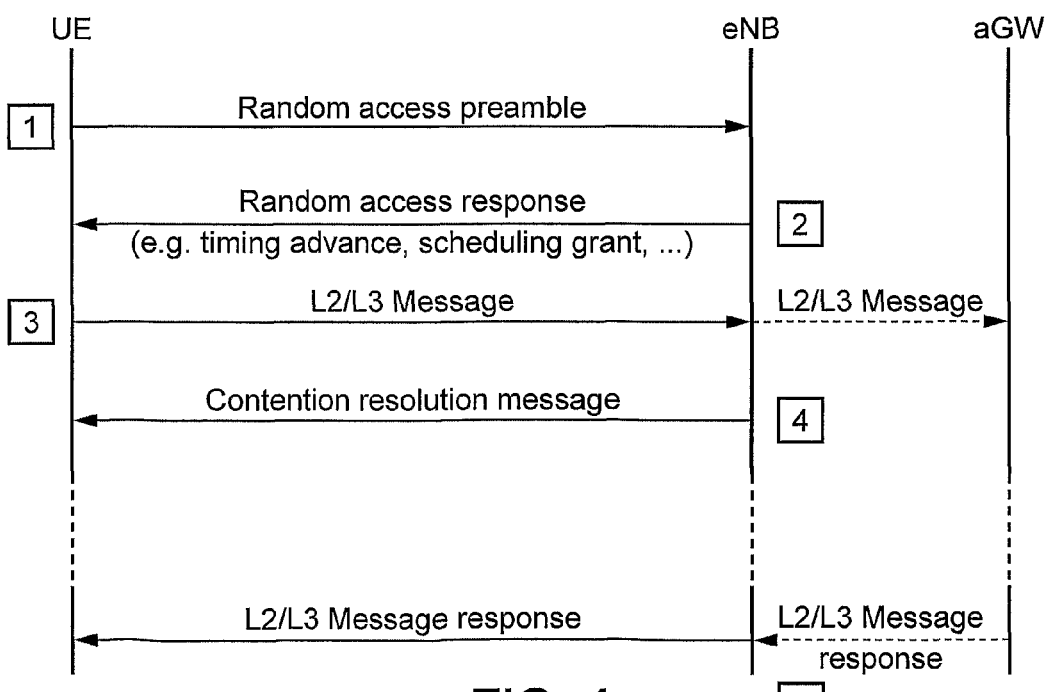
Figure 5:
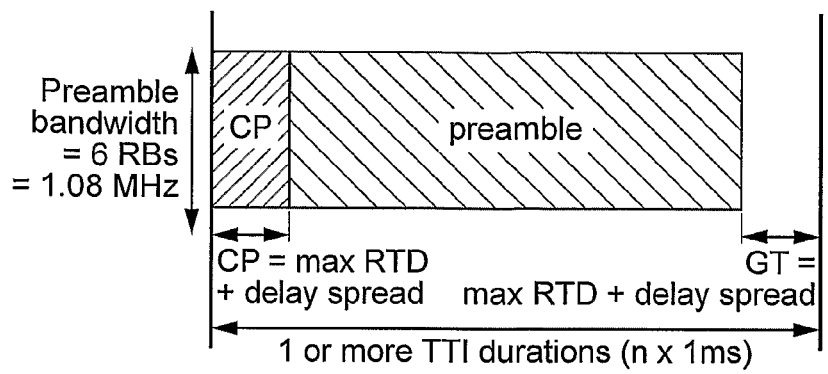
Figure 6:
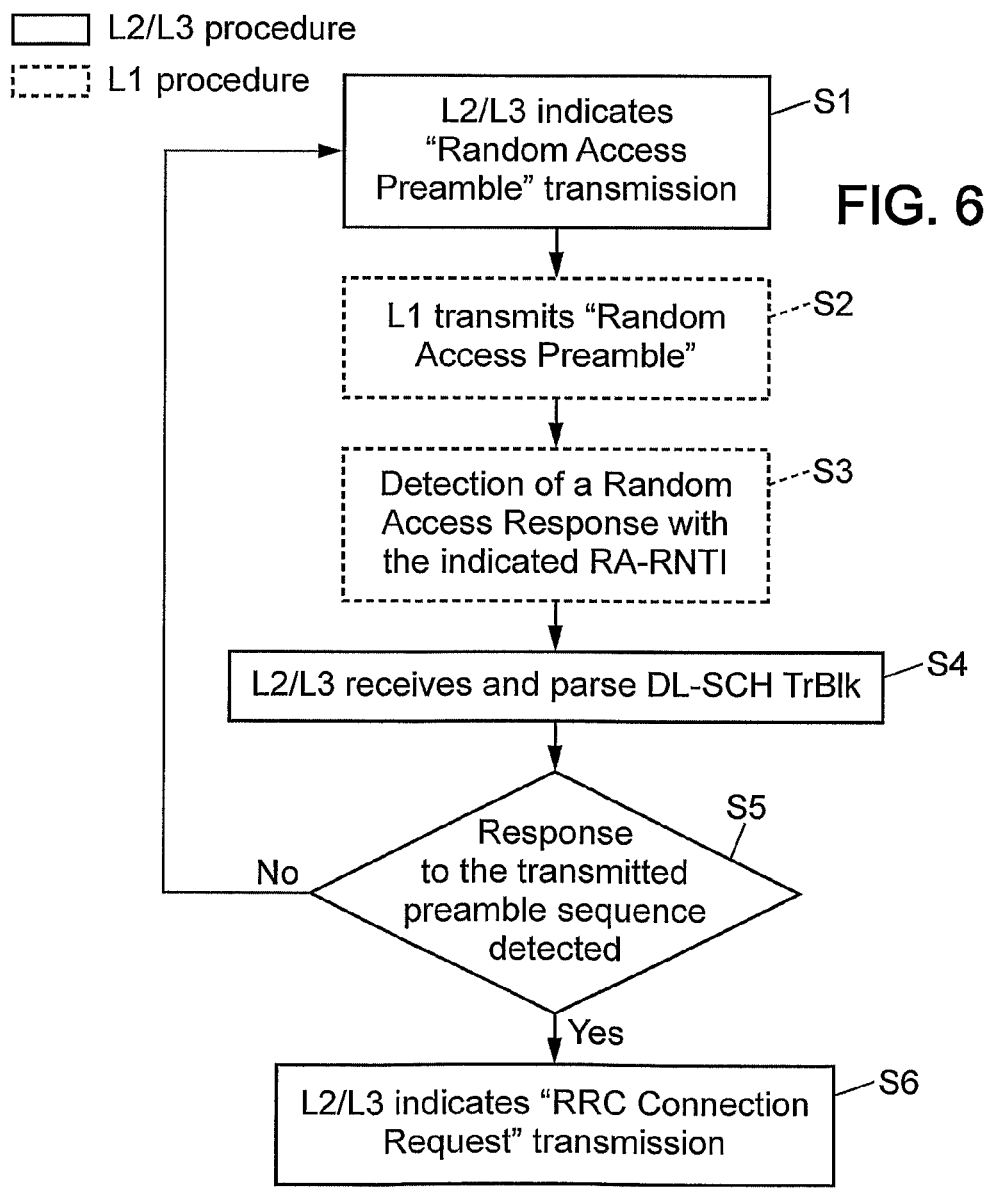

FIG. 4 as described above illustrates an example of a random access procedure between a user equipment UE 101 and a base station eNodeB 103 according to embodiments of the present invention.

As described above, the UE 101 transmits a Random access preamble to the eNB 103 in message 1 of the procedure prior to a RACH connection request. In embodiments of the invention in order that the correct timing for RACH preamble transmission be applied L2/L3 indicates to L1 the cause value corresponding to the cause of the request for random access preamble transmissions. The causes for transmission of a preamble include:

1st Preamble Transmission

Preamble Re-transmission due to a lack of response corresponding to the transmitted preamble sequence in a Random Access Response (RAR); and Preamble Re-transmission if no random access response is received with the indicated RA-RNTI.

For a random access procedure from a L1 point of view, a UE's uplink transmission timing after a random access preamble transmission is as follows.

A. If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n+k_1$, $k_1 \geq 6$, if the UL delay field is set to zero. The UE shall postpone the PUSCH transmission to the next available UL subframe if the field is set to 1.

B. If a random access response is received in subframe n, and the corresponding DL-SCH transport block does not contain a response to the transmitted preamble sequence, the UE shall, if requested by higher layers, be ready to transmit a new preamble sequence no later than in subframe n+5.

C. If no random access response is received in subframe n, where subframe n is the last subframe of the random access response window, the UE shall, if requested by higher layers, be ready to transmit a new preamble sequence no later than in subframe n+4.

In the case where a random access procedure is triggered by the PDCCH indicating downlink data arrival in subframe n, UE shall, if requested by higher layers, transmit random access preamble in the first subframe n+$k_2$, $k_2 \geq 6$, where a PRACH resource is available.

Since three possible causes are identified then at least 2 bits may be used for the timing cause value (additional bits can be reserved if required for the future use). An example of bits value and corresponding causes is given in the Table 1 below:

TABLE 1

Example of transmission timing values

| Transmission Timing Value | RACH transmission timing (if requested by higher layers) | CAUSE |
| --- | --- | --- |
| 00 | No timing rule, as soon as possible where RACH resource are available | 1$^{st}$ preamble transmision |
| 01 | transmit a new preamble sequence no later than in subframe n + 5, where n is subframe of RAR reception | Retransmission due to no preamble response in RAR |
| 10 | transmit a new preamble sequence no later than in subframe n + 4, where n is subframe of RAR reception | Retransmission due to no RAR reception |
| 11 | in the first subframe n + $k_4$, $k_4 \geq 6$, where a PRACH resource is available | When RACH is triggered by the PDCCH indicating downlink data arrival in subframe n, where n is subframe of RAR reception |

In order to apply the correct timing for RACH preamble transmission L2/L3 indicates to LA the cause value or transmission timing value as set out in Table 1 of the request of RACH preamble transmission. The timing may then be applied as follows 1st preamble transmission—In this case L1 as requested by higher layers, transmits a new preamble sequence in the first sub-frame where a PRACH resource is available.

Figure 8:
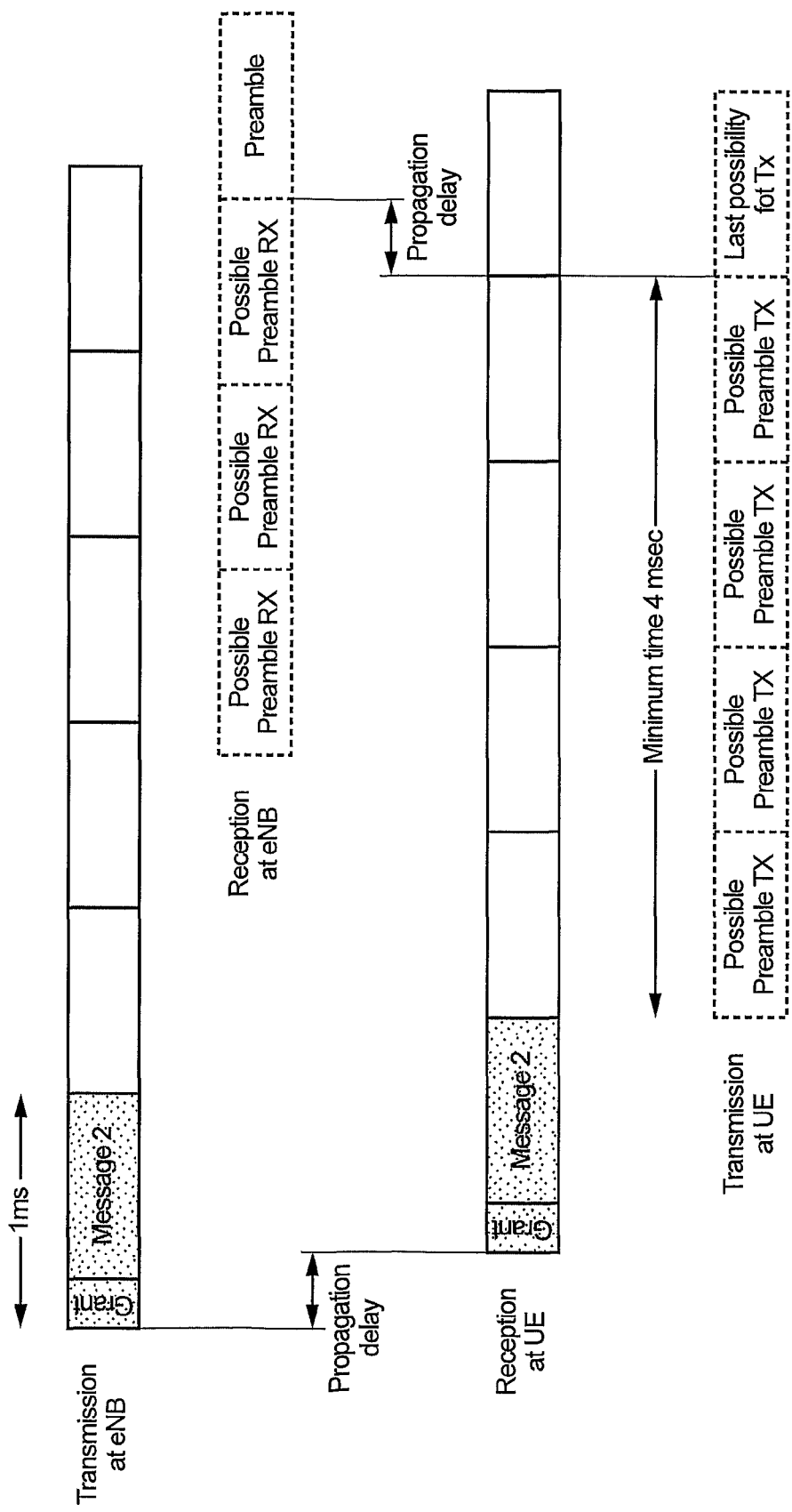
FIG. 8 is an example of timing of preamble retransmission in the case where no response to a transmitted preamble sequence is received

Preamble Re-transmission due to a lack of response corresponding to the transmitted preamble sequence in a Random Access Response (RAR)—In this case the L1 applies timing rule of case B, i.e. the UE shall, if requested by the UE shall, if requested by higher layers, be ready to transmit a new preamble sequence no later than in subframe n+5 as illustrated in FIG. 8.

Figure 9:
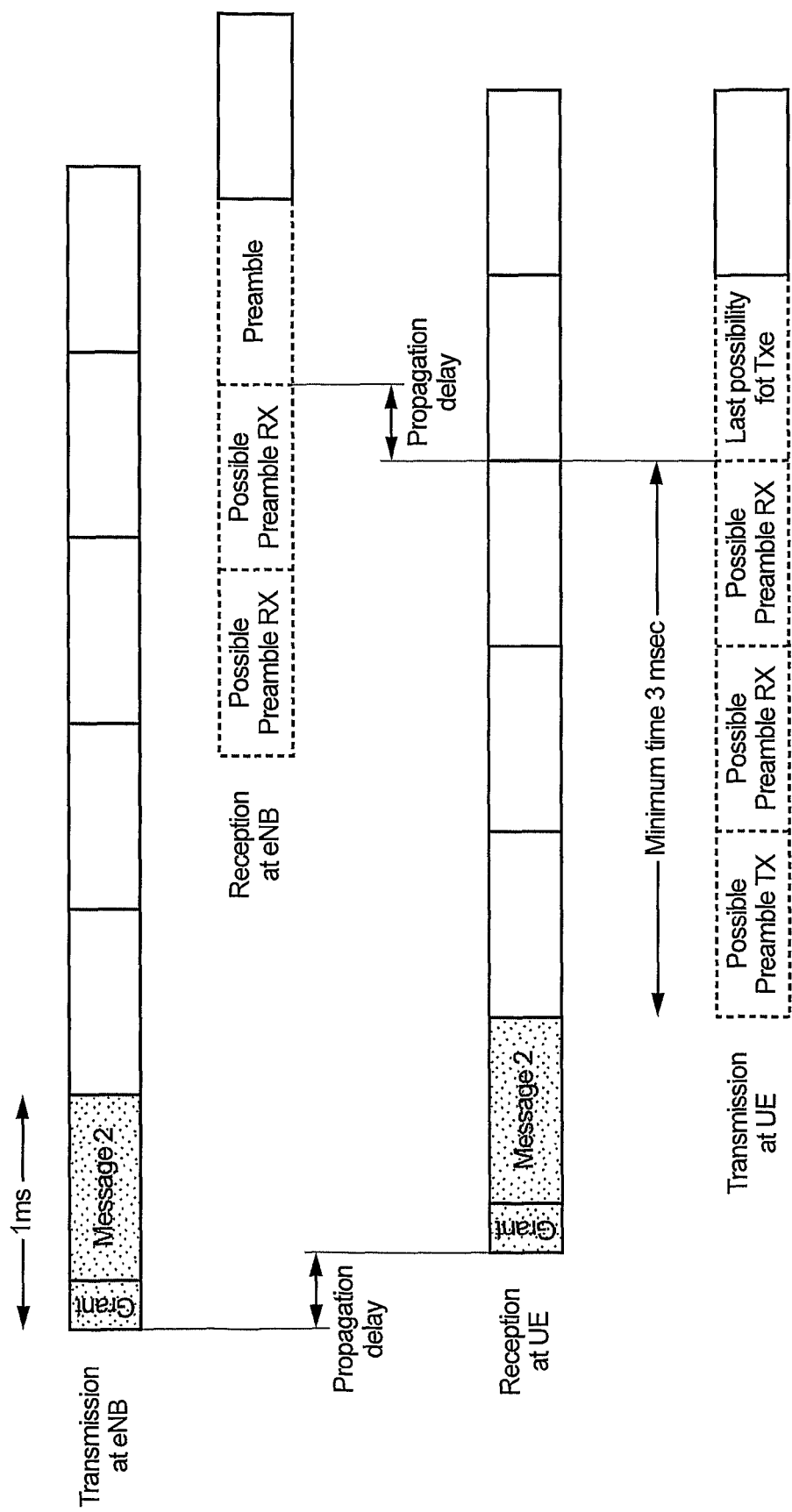
FIG. 9 is an example of timing of preamble retransmission in the case where no received response includes the indicated RA-RNTI of the transmitted preamble

Preamble Re-transmission if no random access response is received with the indicated RA-RNTI. In this case the L1 applies timing rule of case C, i.e. the UE shall, if requested by higher layers, be ready to transmit a new preamble sequence no later than in subframe n+5 as illustrated in FIG. 9.

Figure 7:
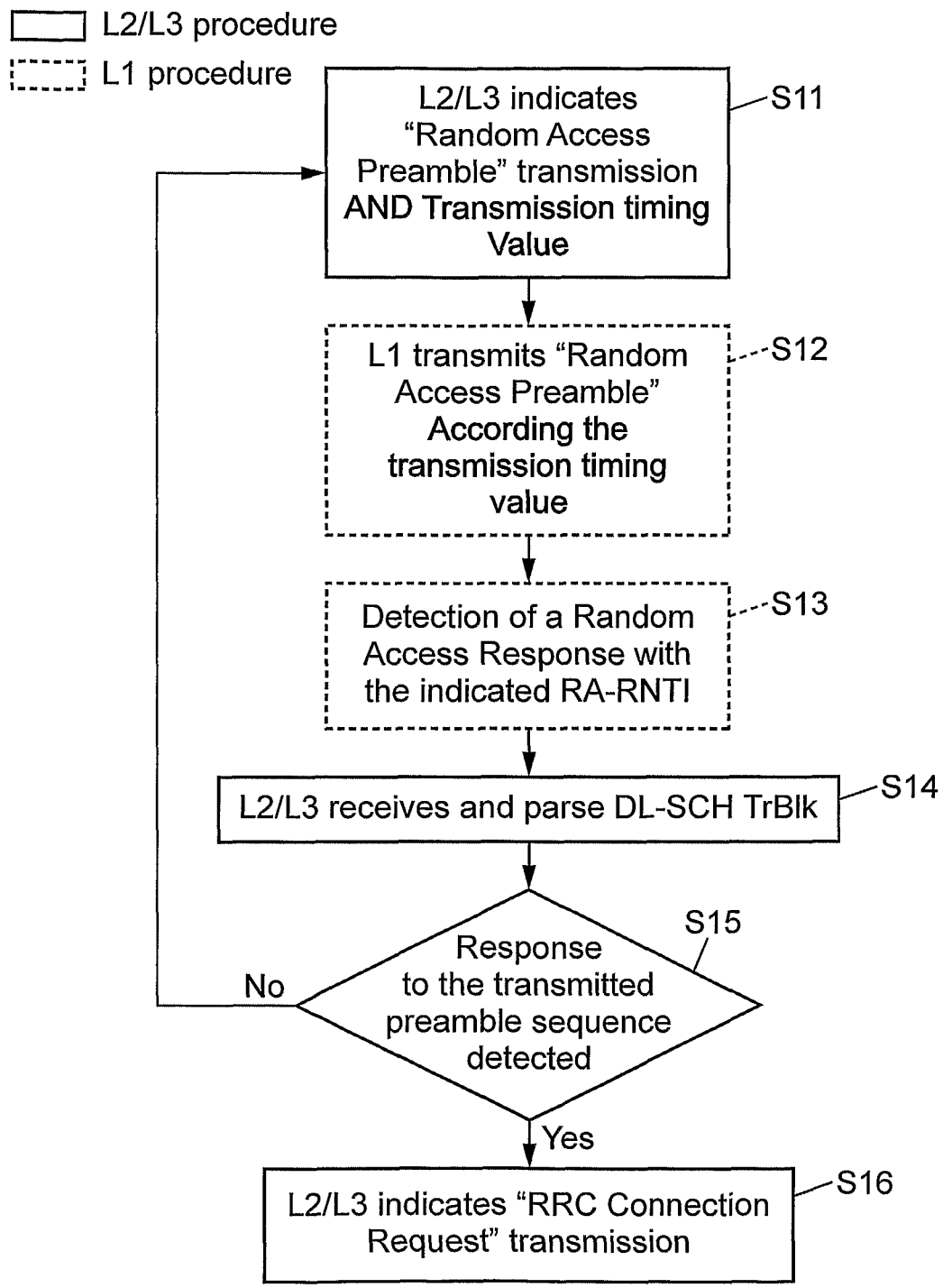
FIG. 7 is a flow chart illustrating a method of random access response according to a first embodiment of the invention.

With reference to FIG. 7 in step S11 the L2/L3 layers indicate to the L1 layer to transmit a random access preamble. In addition the request from L2/L3 to transmit a random access preamble includes a transmission timing value corresponding to the cause of transmission of the random access preamble. The transmission timing value may be any of the values presented in table 1 according to the cause of the RACH preamble transmission; The possible causes for RACH preamble transmission include a random access preamble re-transmission due to a received random access response not corresponding to a previous transmitted random access preamble; a random access preamble re-transmission due to no random access response being received; or a first random access preamble transmission for dedicated random access.

In step S12 the L1 layer transmits a random access preamble according to the received transmission timing value. In step S13 the detection of a random access response with the indicated RA-RNTI is attempted during a window controlled by L2/L3. The corresponding PDSCH transport block is passed to L2/L3 in step S14 which takes charge of parsing the received transport block.

If in step S15 the transport block contains a response to the transmitted preamble sequence then the UL-SCH transport block is transmitted in step S16 according to the timing described for case A above.

If no random access response is received or if a random access response is received but the corresponding transport block does not contain a response to the transmitted preamble sequence then the L2/L3 requests the L1 to transmit a new preamble sequence and transmits a transmission timing value corresponding to the cause of transmission of the random access preamble which in this case would be 01 where the cause is due to no random access response with the corresponding RA-RNTI being received, or 10 where the cause is due to no random access response being received. In step S12 layer L1 transmits a random access preamble according to the indicated transmission timing value.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of random access, the method comprising:
transmitting, by a higher layer, an indicator to a lower layer, indicating to the lower layer to transmit a random access preamble, wherein the indicator includes a cause value indicating a cause of transmission of the random access preamble; and
transmitting, by the lower layer, the random access preamble,
wherein:
when the cause value indicates re-transmission due to a received random access response not corresponding to a previously transmitted random access preamble, the random access preamble is transmitted no later than in a subframe (n+5), wherein the subframe n is the subframe in which the random access response is received; or
when the cause value indicates re-transmission due to no random access response being received in response to a previously transmitted random access preamble, the random access preamble is transmitted no later than in a subframe (n+4), wherein the subframe n is the last subframe of the random access response window.

2. The method according to claim 1, wherein the higher layer corresponds to a Medium Access Control layer, and the lower layer corresponds to a Physical layer.

3. The method according to claim 1, wherein, when the cause value indicates an initial random access preamble transmission, the random access preamble is transmitted in a subframe where a physical random access channel (PRACH) resource is available.

4. A user equipment comprising:
a transceiver for transmitting a random access preamble and for receiving a random access response within a random access response window,
wherein the user equipment is operable at least on a higher layer and a lower layer,
wherein the higher layer is configured to transmit an indicator to the lower layer, indicating to the lower layer to transmit a random access preamble, the indicator including a cause value indicating a cause of transmission of the random access preamble, and
wherein the lower layer is configured to transmit the random access preamble,
wherein:
when the cause value indicates re-transmission due to a received random access response not corresponding to a previously transmitted random access preamble, the random access preamble is transmitted no later than in a subframe (n+5), wherein the subframe n is the subframe in which the random access response is received; or
when the cause value indicates re-transmission due to no random access response being received in response to a previously transmitted random access preamble, the random access preamble is transmitted no later than in a subframe (n+4), wherein the subframe n is the last subframe of the random access response window.

5. The user equipment according to claim 4, wherein the higher layer corresponds to a Medium Access Control layer, and the lower layer corresponds to a Physical layer.

6. The user equipment according to claim 4, wherein, when the cause value indicates an initial random access preamble transmission, the random access preamble is transmitted in a subframe where a physical random access channel (PRACH) resource is available.

7. A computer program product for a data-processing device, the computer program product comprising a set of instructions which, when loaded into the data-processing device, causes the device to:
transmit, by a higher layer, an indicator to a lower layer, indicating to the lower layer to transmit a random access preamble, wherein the indicator includes a cause value indicating a cause of transmission of the random access preamble; and
transmit, by the lower layer, the random access preamble, wherein:
when the cause value indicates re-transmission due to a received random access response not corresponding to a previously transmitted random access preamble, the random access preamble is transmitted no later than in a subframe (n+5), wherein the subframe n is the subframe in which the random access response is received; or
when the cause value indicates re-transmission due to no random access response being received in response to a previously transmitted random access preamble, the random access preamble is transmitted no later than in a subframe (n+4), wherein the subframe n is the last subframe of the random access response window.

* * * * *